C. N. SOWDEN.
SHOCK ABSORBER.
APPLICATION FILED JUNE 12, 1912.
1,057,292.
Patented Mar. 25, 1913.
2 SHEETS—SHEET 1.
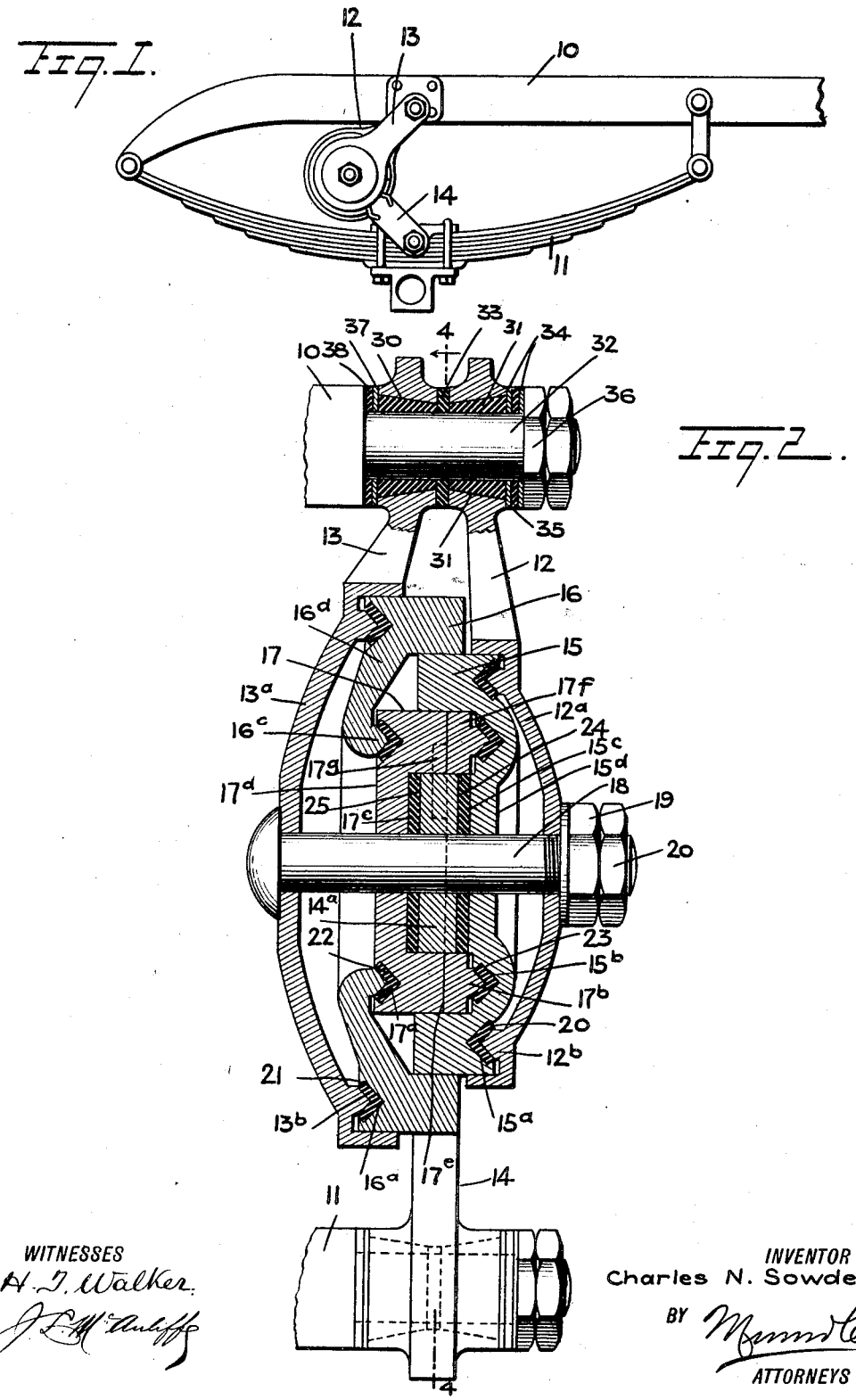
WITNESSES
H. J. Walker
J. L. McAuliffe
INVENTOR
Charles N. Sowden
BY Mundles
ATTORNEYS

C. N. SOWDEN.
SHOCK ABSORBER.
APPLICATION FILED JUNE 12, 1912.

1,057,292.

Patented Mar. 25, 1913.
2 SHEETS—SHEET 2.

WITNESSES
H. J. Walker
J. L. McAuliffe

INVENTOR
Charles N. Sowden,
BY
ATTORNEYS

UNITED STATES PATENT OFFICE.

CHARLES N. SOWDEN, OF GUANTANAMO, CUBA.

SHOCK-ABSORBER.

1,057,292.

Specification of Letters Patent.  Patented Mar. 25, 1913.

Application filed June 12, 1912. Serial No. 703,156.

*To all whom it may concern:*

Be it known that I, CHARLES N. SOWDEN, a citizen of Canada, and a resident of Guantanamo, Cuba, have invented a new and Improved Shock-Absorber, of which the following is a full, clear, and exact description.

My invention relates to attachments for vehicles, particularly motor-driven vehicles, to absorb the severe shocks to which the vehicle is subjected, the shock absorber acting to take up the vibrations due to the yielding and recoil of the springs supporting the vehicle body.

It is a design of my invention to provide a shock absorber in which the resistance to the vibrations will be proportionate to the shocks, and a further design of the invention is to provide elements in the absorber so arranged that they will be brought into action successively by the movements of the levers or securing arms, the friction elements being picked up by the levers in succession to function cumulatively in proportion to the number of the elements that are brought into action by the continuing movement of the levers in response to a severe shock.

A further design of my invention is to provide a shock absorber in which the elements may be multiplied within any reasonable limits without altering the essential form and arrangement of the friction members and levers, it being possible to increase the number of levers and their associated complement of friction elements.

It is a further design of my invention to provide a construction and arrangement of the levers and friction elements that will permit of a ready alteration in the degree of frictional resistance afforded.

It is also an object of my invention to provide a construction of shock absorber in which the parts may be assembled with convenience and despatch, and as readily dismembered when required, for repair or renewal.

The distinguishing features of my invention, and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 3:
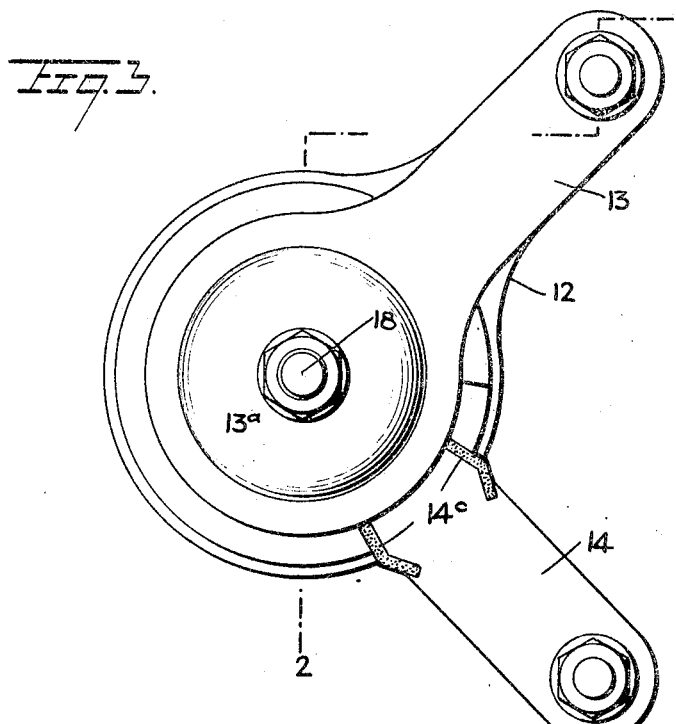
Figure 4:
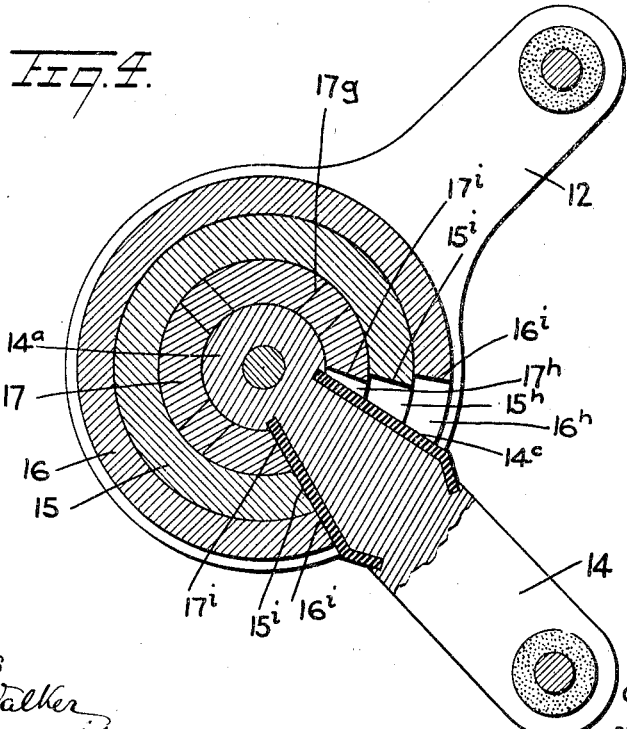

Figure 1 is a side elevation of my improved shock absorber applied to a vehicle body and spring; Fig. 2 is a transverse vertical section on a larger scale, the section being taken approximately on the line 2—2 of Fig. 3; Fig. 3 is a side elevation of the absorber, detached from the vehicle; and Fig. 4 is a sectional view approximately on the line 4—4 of Fig. 2.

I have illustrated one constructional embodiment of my invention as affording an example of a practical form. In the example shown, the absorber comprises levers adapted to be secured at their outer ends respectively to a body portion 10 of a vehicle and a spring 11 thereof. The levers are in fixed relation to friction disks, there being friction disks for each lever, and the levers being of a number required to produce, with their co-acting friction elements, the desired effect.

The form shown comprises two levers 12, 13, attachable to the body 10, and a single lever 14, attachable to the spring 11. The disks $12^a$, $13^a$ are complementary to their respective levers and rigid therewith, being preferably formed integral with the lever. The disks $12^a$, $13^a$ are concavo-convex, while the disk $14^a$, which is complementary to the lever 14 attached to the spring or other equivalent part, is preferably flat, formed with plane outer faces, and the outer disks $12^a$, $13^a$, are spaced apart a sufficient distance to receive between them the co-acting friction elements. The friction elements are desirably in the form of rings, there being in the specific example shown a ring 15, adjacent to and opposing one outer disk $12^a$, and a ring 16, adjacent to and opposite the outer disk $13^a$. The ring 15 is smaller in diameter, and is received within the larger ring 16. A third ring 17, of still smaller diameter, is received within the ring 15, outside of the disk $14^a$ of the lever 14, and a bolt 18 extends through the several disks and constitutes the axis of the disks and the several rings 15, 16, 17, the bolt being provided with a nut 19 and a locking nut 20, as is usual. The bolt and nut serve to exert pressure on the outer disks $12^a$ and $13^a$, to produce the desired frictional engagement between contacting faces of the several elements.

It is desirable to employ friction material interposed between the various opposed faces of the disks and rings, and in the construction shown, the ring 15 has a V-shaped groove 15ᵃ, opposite which there is formed on the disk 12ᵃ an annular V-shaped rib 12ᵇ, and between the said ring and rib in the V-shaped groove, a V-shaped washer 20, of high friction material, such as leather, or the like, is interposed. Similarly, between the other exterior disk 13ᵃ and the adjacent friction ring 16, is interposed a V-shaped washer 21, which is received between an annular rib 13ᵇ on said disk, and the ring 16 in a V-shaped groove 16ᵃ formed in said ring. The ring 16, in the example shown, is double-acting to exert friction at opposite faces, to carry out which idea a second annular rib 16ᶜ is formed, concentric with the groove 16ᵃ, the said rib being produced on the flange 16ᵈ that extends in the direction of the axis from the said ring 16. The rib 16ᶜ bears against a friction washer 22, preferably V-shaped, which is received in the V-groove 17ᵃ of the ring 17. The ring 17 is double-acting, having friction members on opposed faces, the face opposite the groove 17ᵃ being formed with a rib 17ᵇ, preferably V-shaped, said rib bearing against a V-shaped washer 23 which is received in a V-groove 15ᵇ formed in the inner face of the ring 15. Additional washers 24 and 25 are provided, one lying against each face of the disk 14ᵃ of the lever 14, between the said disk 14ᵃ and the opposed inner faces 15ᶜ and 17ᶜ of hubs or flanges 15ᵈ and 17ᵈ that extend from the rings 15, 17 to the bolt 18.

For the assembling of the members, the ring 17 is in two parts, the ring being divided in a plane parallel with the ring, as indicated by the line 17ᵉ, the member 17ᶠ of the ring 17 having inter-engagement with the body of the ring through the medium of corresponding radial ribs and grooves, indicated at 17ᵍ. The parts are assembled, for instance, by first placing one outer disk 13ᵃ on the bolt 18, next the adjacent disk 16, next the body of the ring 17 with its flange 17ᵈ, next the lever 14 with its disk 14ᵃ, then the section 17ᶠ of the ring 17, then the ring 15, and finally the lever 12 and its disk 12ᵃ, it being understood that certain of the elements mentioned are provided with their respective friction washers when being assembled, so that the described washers will be interposed at the proper points between the rings and disks. Increased friction is produced by forming the levers 12, 13 with conical bores 30, which receive bushings 31 that are tapered exteriorly, the bushings being formed of leather, or other material high in friction properties, and surrounding the bolt or stud 32 that secures the levers 12, 13, to the body member 10. Advantageously, also, a washer 33, of leather, or the like, is interposed between the adjacent ends of the tapered bushings 30. The connection may be completed by spaced metallic washers 34, and an interposed washer 35 of leather, said washers being placed on the bolt 32 adjacent to the nut 36. An additional metallic washer 37 and leather washer 38 may be employed between the inner lever 13 and the body part 10. Similarly, tapered bushings, washers, etc., are employed in connection with the lever 14, and as these are in all respects the same as the corresponding elements just described in connection with the levers 12 and 13, they need not be referred to more particularly.

The rings 15, 16 and 17 are provided respectively with recesses 15ʰ, 16ʰ and 17ʰ, formed at one side of each ring, that accommodate the lever 14. The side walls of the mentioned recesses present respectively contact surfaces 15ⁱ, 16ⁱ and 17ⁱ, against which the opposite sides of the lever 14 engage; the said contact surfaces are spaced different distances apart in the respective rings; thus as seen in Fig. 4, the contact surfaces 17ⁱ of the inner ring 17 are a less distance apart than the similar surfaces in the next outer ring 15, and the contact surfaces in the outermost ring 16 are spaced still farther apart. The arrangement is such that the lever 14 will successively contact with the said rings, beginning, in the example shown, with the inner ring. In the case of a severe shock, resulting in a pronounced movement of the lever 14 toward the levers 12 and 13, the lever 14 will first engage the ring 17 and will be resisted by said ring; in a further movement of the lever, the intermediate ring 15 will be engaged, and its frictional resistance will be added to that of the ring 17, and finally the outermost ring 16 will be engaged by the lever 14 and its frictional resistance added to the other ring in response to the movement of the levers. Upon the recoil, a similar result will follow, the opposite contacting walls of the recesses 15ʰ, 16ʰ and 17ʰ being successively engaged by the lever 14. The contacting faces of the lever may be provided with cushioning devices 14ᵉ, as in Figs. 4 and 5.

Specifically, the initial resistance is between the faces of 14ᵃ and the adjacent faces 15 and 17; when the lever 14 contacts with the surface 17ⁱ, the disk 14ᵃ moves as a unit with the disk 17, when instead of the first-named resistance there is substituted that between one face of the disk 14ᵃ and the adjacent face 15, supplemented by the resistance between the two faces of the member 17 with the opposed faces of the elements 15, 16. Similarly, when the lever 14 picks up the element 15 a new resistance is added, consisting of the opposed frictional surfaces between the said element 15 and the adjacent disk 12ᵃ, and although one of the resistances between the element 17 and the opposed frictional surfaces on the elements 15, 16 ceases to be effective after 15 has been picked up, the added friction due to the picking up of the element 15 gives a net increase because of the greater frictional area between said element 15 and the disk 12ª. A similar condition arises when the element 16 is finally picked up by the lever 14, and although one of the friction surfaces, previously active in connection with the element 17, becomes inactive, the greater frictional area due to the picking up of the element 16 gives a net increase in the resistance.

The outer rings or disks carried by the levers 12, 13, it will be seen, have a limited movement toward the disk 14ª of the opposite lever 14, and therefore the degree of friction between the disk 14ª and the adjacent friction-producing elements will be regulated by the thickness of the washers 24, 25. Thus the initial resistance offered by the shock absorber will be according to the thickness of the washers 24, 25, until the lever 14 picks up the first ring 17.

The form of the friction members provided on the levers 12, 13, and the specific forms of the other friction-producing elements, it will be understood, may be varied in practice without departing from the invention.

Having thus described my invention, I claim as new and desire to secure by Letters Patent:

1. A shock absorber, comprising outer disks, an inner disk of less diameter than the outer disks, levers carrying said disks, and elements between the respective disks and comprising ring parts extending toward each other beyond the periphery of the inner disk, said ring parts having frictional engagement respectively with the outer disks.

2. A shock absorber, comprising outer disks, an inner disk of less diameter than the outer disks, levers carrying said disks, elements between the respective disks and comprising ring parts extending toward each other beyond the periphery of the inner disk, said ring parts having frictional engagement respectively with the outer disks, and an additional element between the inner of said ring parts and the periphery of the inner disk and having frictional surfaces engaging both of said first-mentioned ring parts.

3. A shock absorber, comprising outer disks, an inner disk of less diameter than the outer disks, levers carrying said disks, a friction element between one of said outer disks and the opposed face of the inner disk, and provided with a surface frictionally engaging the said inner disk and provided with a ring outside of the periphery of the inner disk, a second friction element outside said ring and between the said ring and the other of the outer disks, and a third friction element within said rings and having surfaces co-acting with the second-mentioned friction elements, and a surface co-acting with the inner disk, said three friction elements having contact surfaces spaced different distances apart and with which one of the levers is movable into successive contact.

4. A shock absorber, comprising an inner disk, a ring outside of and adjacent to said inner disk and divided diametrically into two members, a second ring outside of the first ring, a third ring outside of said second ring, outer disks in frictional engagement with said second and third rings, and levers carrying said disks and movable relatively to each other, the inner disk having frictional engagement with the first-mentioned ring, the said first-mentioned ring having frictional engagement with the second and third ring.

In testimony whereof, I have signed my name to this specification, in the presence of two subscribing witnesses.

CHARLES N. SOWDEN.

Witnesses:
P. F. FERRER,
H. M. WOLCOTT.

---

Copies of this patent may be obtained for five cents each, by addressing the "Commissioner of Patents, Washington, D. C."